United States Patent
Wollbrand et al.

(10) Patent No.: US 8,348,155 B2
(45) Date of Patent: Jan. 8, 2013

(54) ALL IN ONE CARD

(75) Inventors: Karin Wollbrand, Luleå (SE); Torbjörn Minde, Gammelstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 87 days.

(21) Appl. No.: 12/678,681

(22) PCT Filed: Sep. 21, 2007

(86) PCT No.: PCT/SE2007/050672
§ 371 (c)(1),
(2), (4) Date: Mar. 17, 2010

(87) PCT Pub. No.: WO2009/038511
PCT Pub. Date: Mar. 26, 2009

(65) Prior Publication Data
US 2010/0213253 A1    Aug. 26, 2010

(51) Int. Cl.
*G06Q 40/00* (2012.01)
*G07D 11/00* (2006.01)
*G07F 19/00* (2006.01)
*G06K 5/00* (2006.01)
*G06K 7/08* (2006.01)
*G06K 19/00* (2006.01)
*G06K 19/06* (2006.01)

(52) U.S. Cl. ........ 235/380; 235/379; 235/449; 235/487; 235/492; 235/493

(58) Field of Classification Search .................. 235/380, 235/379, 449, 487, 492, 493; 902/8, 25
See application file for complete search history.

(56) References Cited

U.S. PATENT DOCUMENTS

| | | | | |
|---|---|---|---|---|
| 5,221,838 | A * | 6/1993 | Gutman et al. | 235/379 |
| 6,047,888 | A * | 4/2000 | Dethloff | 235/380 |
| 7,046,574 | B2 * | 5/2006 | Furukawa | 365/230.01 |
| 7,424,732 | B2 * | 9/2008 | Matsumoto et al. | 726/2 |
| 7,558,110 | B2 * | 7/2009 | Mizushima et al. | 365/185.04 |
| 7,913,910 | B2 * | 3/2011 | Hammer | 235/462.15 |
| 7,941,197 | B2 * | 5/2011 | Jain et al. | 455/575.8 |

(Continued)

FOREIGN PATENT DOCUMENTS

EP    0820178 A2    1/1998

(Continued)

OTHER PUBLICATIONS

Swedish Patent Office, Int'l Search Report in PCT/SE2007/050672, Jun. 9, 2008.

(Continued)

*Primary Examiner* — Daniel Walsh
(74) *Attorney, Agent, or Firm* — Potomac Patent Group PLLC

(57) ABSTRACT

The invention comprises arrangement and methods for contact- and contactless-services, e.g. payments, money transfer, electronic tickets or identity cards. A card comprises a point of service interface for communication with a point of service, a card database, a mobile terminal interface for connect the card to a mobile terminal connectable to a telecommunication network. The card database can be controlled by the mobile terminal. The card database is configured for storing data and the card data can be accessed via the point of service interface. The date stored in the card database relates to e.g. bank cards, credit cards, identification, tickets, electronic money, identification 15 cards. The invention also comprises a mobile terminal (MT) suitable for communication with the card described.

11 Claims, 2 Drawing Sheets

U.S. PATENT DOCUMENTS

| | | | | |
|---|---|---|---|---|
| 8,005,508 B2 * | 8/2011 | Miyazaki et al. | | 455/558 |
| 8,016,192 B2 * | 9/2011 | Messerges et al. | | 235/380 |
| 8,055,581 B2 * | 11/2011 | Royyuru et al. | | 705/39 |
| 8,056,802 B2 * | 11/2011 | Gressel et al. | | 235/382 |
| 8,061,620 B2 * | 11/2011 | Phillips | | 235/492 |
| 8,063,781 B2 * | 11/2011 | Dewan | | 340/572.1 |
| 8,064,954 B1 * | 11/2011 | Fujisaki | | 455/556.1 |
| 8,161,330 B1 * | 4/2012 | Vannatter et al. | | 714/48 |
| 8,244,631 B2 * | 8/2012 | Ueno et al. | | 705/39 |
| 2001/0002035 A1 * | 5/2001 | Kayanakis | | 235/492 |
| 2001/0013551 A1 * | 8/2001 | Ramachandran | | 235/472.02 |
| 2002/0040930 A1 * | 4/2002 | Kitai et al. | | 235/440 |
| 2002/0046226 A1 * | 4/2002 | Nakabe et al. | | 708/250 |
| 2002/0186134 A1 * | 12/2002 | Rehfus et al. | | 340/572.8 |
| 2003/0041244 A1 * | 2/2003 | Buttyan et al. | | 713/172 |
| 2003/0101313 A1 * | 5/2003 | Furukawa | | 711/103 |
| 2003/0230631 A1 * | 12/2003 | Tsunoda et al. | | 235/492 |
| 2004/0014423 A1 * | 1/2004 | Croome et al. | | 455/41.2 |
| 2004/0035930 A1 * | 2/2004 | Arisawa et al. | | 235/451 |
| 2004/0041029 A1 * | 3/2004 | Postman et al. | | 235/462.3 |
| 2004/0065734 A1 * | 4/2004 | Piikivi | | 235/451 |
| 2004/0087339 A1 * | 5/2004 | Goldthwaite et al. | | 455/558 |
| 2004/0129785 A1 * | 7/2004 | Luu | | 235/486 |
| 2004/0129787 A1 * | 7/2004 | Saito et al. | | 235/492 |
| 2004/0150468 A1 * | 8/2004 | Shimizu et al. | | 327/566 |
| 2004/0206821 A1 * | 10/2004 | Longacre et al. | | 235/462.07 |
| 2004/0245347 A1 * | 12/2004 | Shibamoto et al. | | 235/492 |
| 2004/0256464 A1 * | 12/2004 | Longacre et al. | | 235/462.45 |
| 2005/0023345 A1 * | 2/2005 | Furuyama et al. | | 235/382 |
| 2005/0096088 A1 * | 5/2005 | Bae | | 455/558 |
| 2005/0127166 A1 * | 6/2005 | Minemura | | 235/380 |
| 2005/0167512 A1 * | 8/2005 | Minemura et al. | | 235/492 |
| 2005/0245995 A1 * | 11/2005 | Diebold | | 607/60 |
| 2006/0011731 A1 * | 1/2006 | Anders et al. | | 235/492 |
| 2006/0054695 A1 * | 3/2006 | Owada | | 235/440 |
| 2006/0054709 A1 * | 3/2006 | Lee | | 235/492 |
| 2006/0091200 A1 | 5/2006 | Lai et al. | | |
| 2006/0206343 A1 * | 9/2006 | Nakanishi et al. | | 705/1 |
| 2006/0258337 A1 * | 11/2006 | Fujita et al. | | 455/414.1 |
| 2006/0264240 A1 * | 11/2006 | Arai | | 455/558 |
| 2007/0090182 A1 | 4/2007 | Phagura et al. | | |
| 2007/0119941 A1 * | 5/2007 | He | | 235/462.15 |
| 2007/0253251 A1 * | 11/2007 | Mizushima et al. | | 365/185.04 |
| 2008/0009317 A1 * | 1/2008 | Lasser et al. | | 455/558 |
| 2008/0083829 A1 * | 4/2008 | Lowe | | 235/486 |
| 2008/0237331 A1 * | 10/2008 | Hammer | | 235/375 |
| 2008/0290158 A1 * | 11/2008 | Ando et al. | | 235/380 |
| 2009/0030844 A1 * | 1/2009 | Hoffman et al. | | 705/67 |
| 2009/0133116 A1 * | 5/2009 | Waisbard et al. | | 726/17 |
| 2009/0156238 A1 * | 6/2009 | Smith | | 455/466 |
| 2009/0191919 A1 * | 7/2009 | Kawamura | | 455/558 |
| 2009/0209289 A1 * | 8/2009 | Miyazaki et al. | | 455/558 |
| 2009/0236416 A1 * | 9/2009 | Morita | | 235/380 |
| 2010/0026464 A1 * | 2/2010 | Graeber | | 340/10.1 |
| 2010/0163614 A1 * | 7/2010 | Yang et al. | | 235/375 |
| 2010/0227558 A1 * | 9/2010 | Sueoka et al. | | 455/41.2 |
| 2010/0240304 A1 * | 9/2010 | Ishibashi | | 455/41.2 |
| 2010/0294843 A1 * | 11/2010 | Kim | | 235/492 |
| 2010/0311466 A1 * | 12/2010 | Wilson et al. | | 455/557 |
| 2011/0062242 A1 * | 3/2011 | Cowcher | | 235/492 |
| 2011/0140841 A1 * | 6/2011 | Bona et al. | | 340/5.83 |
| 2011/0208648 A1 * | 8/2011 | Alothaimeen | | 705/39 |
| 2011/0241837 A1 * | 10/2011 | Suzuki | | 340/10.1 |
| 2011/0244799 A1 * | 10/2011 | Roberts et al. | | 455/41.2 |
| 2011/0269438 A1 * | 11/2011 | Narendra et al. | | 455/414.1 |
| 2011/0288967 A1 * | 11/2011 | Selfridge | | 705/30 |
| 2012/0129452 A1 * | 5/2012 | Koh et al. | | 455/41.1 |
| 2012/0179599 A1 * | 7/2012 | Meimes et al. | | 705/38 |
| 2012/0197740 A1 * | 8/2012 | Grigg et al. | | 705/16 |

FOREIGN PATENT DOCUMENTS

| | | | |
|---|---|---|---|
| JP | 2005352544 A | * | 12/2005 |
| WO | 01/61640 A1 | | 8/2001 |
| WO | 2004/012352 A1 | | 2/2004 |

OTHER PUBLICATIONS

Swedish Patent Office, Written Opinion in PCT/SE2007/050672, Jun. 9, 2008.

* cited by examiner

ALL IN ONE CARD

TECHNICAL FIELD

The present invention relates to electronic commerce.

BACKGROUND

There exist two major solutions for face-to-face payments today—cash and plastic cards. In Japan and in some pilot trials in a few other countries it is also possible to make wireless face-to-face payments with the mobile phone. In Japan this system has been developed by a joint venture between NTT DoCoMo and Sony. The system is called Mobile FeliCa and is quite widely used. Mobile FeliCa is also possible to use for transportation payments, i.e. the phone is just swiped over a scanner at the entrance to the means of transportation.

The plastic cards can be divided into two categories—cards with magnetic strip only and cards with an integrated circuit (and sometimes a magnetic strip as well), so called smart cards. Today the magnetic strip is by far the most widespread plastic card solution, but it is not as secure as the smart card solution. There are some problems with the existing solutions.

Concerning plastic card, one plastic card for each application is needed. This often implies that your wallet is overflowed with plastic cards or that you left the card you need at home. One PIN-code to each card is often needed. Many users have difficulties to remember all the different PIN-codes. To be able to use Wireless payments with a mobile phone, retailers need to invest in a new POS (Point Of Sales) system (new wireless payment-enabled scanners) to be able to offer wireless payments. A handset which enables wireless face-to-face payments is also needed. For the solutions available today (e.g. Mobile FeliCa) this implies the need for a mobile phone with special HW and SW. If the mobile phone is not working for some reason (e.g. no battery left), it is not possible to pay. It is not possible to use the wireless payment solution at all retailers. This implies that the users will still need all the "old" plastic cards in the wallet and it will be difficult to get over the chasm between the early adopters and the early majority pragmatists. If the mobile phone is used for transportation payment this means that the user either has to have a headset or interrupt an ongoing call to be able to enter the means of transportation.

In the smart card case one card per application is still needed, i.e. the number of cards in the wallet does not decrease by using smart card. There are today a lot of services where the consumer needs a card. Payment is one example. There are also all kinds of member cards, ID cards, etc. The wallet could easily be quite full.

The advantage of smart cards for the customers is not very obvious (mainly security). This slows down the transition process.

A new POS system is needed. At the moment rather few retailers accept smart cards which means that the customer interest for such a solution is quite weak—This, in turn, implies that the retailers lack incentive to invest in such equipment.

Cash could be inconvenient and not so secure. The user needs a lot of cash in the wallet and he has to get the cash from either an ATM or from the bank.

SUMMARY

The invention comprises arrangement and methods for contact- and contactless-services, e.g. payments, money transfer, electronic tickets or identity cards.

A card comprises a point of service interface (SIF) for communication with a point of service, a card database (CDB), a mobile terminal interface (TIF) for connect the card to a mobile terminal (MT) connectable to a telecommunication network. The card database (CDB) is configured for being controlled by the mobile terminal (MT). The card database is configured for storing data (e.g. A11, A12, E11) and the card data can be accessed via the point of service interface. The date stored in the card database relates to e.g. bank cards, credit cards, identification, tickets, electronic money, identification cards.

The invention also comprises a mobile terminal (MT) suitable for communication with the card described. The mobile terminal comprises a network interface (NIF) towards a telecommunication network, a user interface (UI) and a terminal database (TDB) configured for storing data (A21, A22, E21) received from the telecommunication network. It also comprises a card interface (CIF) suitable for connecting the mobile terminal (MT) with the card and a card function (CF) suitable for controlling and transfer data between the mobile terminal (MT) and the card database (CDB) via the card interface (CIF).

The invention will now be described more in detail with the aid of preferred embodiments in connection with the enclosed drawings.

DETAILED DESCRIPTION

Figure 1:
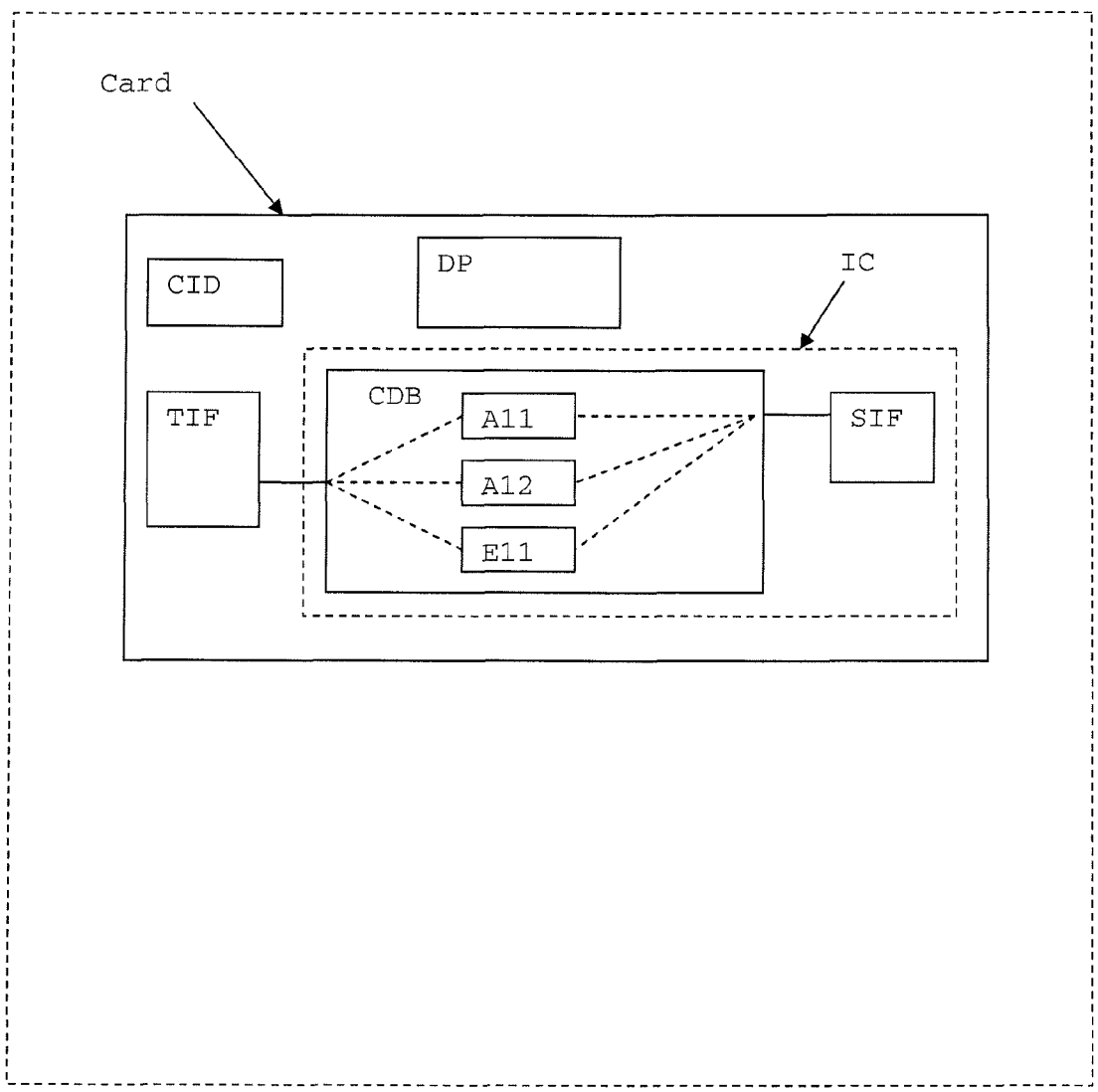
FIG. 1 is block diagram illustrating a card comprising an interface towards a mobile terminal and a point of service.

FIG. 1 illustrates a wireless all in one card WAIO comprising a point of service interface SIF, a database CDB, a mobile terminal interface TIF suitable for connect the card with a mobile terminal MT, and data A11, A12, E11. The data can be received from the mobile terminal MT.

The service interface makes it possible for the WAIO-card to communicate with a point of service. This could be a store, restaurant, golf club or any kind of service provider. This interface is preferably one of the standard interface used today, e.g. the smart card interface.

The data A11, A12, E11 correspond to the data necessary for the WAIO card to work as a regular card. A11 could be a bank card, A12 could be membership card, and E11 could be electronic money. This is only examples other examples are transportation cards, identification cards and all kind of tickets. Of course you can have more than 3 types of different data. The data can e.g. be downloaded from a mobile terminal via the mobile terminal interface. This interface can preferably be wireless but it is of course possible to have another type of interface to the mobile terminal. Data could also be downloaded via the SIF.

WAIO can then be used as cards are used today, i.e. for payments (credit card, bank card, cash card), to register membership points, as an ATM card etc. Examples for payment are E-money, Credit card and Bank card. Different types of member cards are possible, e.g. Points cards (like MQ card, ICA card etc.), membership cards which implies discounts (Clubs, ICA card etc.), member's cards with advance bookings (e.g. punch-tickets at a gym or solarium). Different kinds of tickets are a possibility, transportation tickets, cinema tickets etc. The WAIO-card could be pre-loaded with tickets to spare time when entering a train, bus or airplane. This is valid if the transport system uses a payment system where either a wireless smart card or a smart card can be used. It is possible to transfer tickets to another person's mobile phone or WAIO-card. All kind of coupons could be stored in the card. Other examples of use of the card are keys, file transfer, signatures and different types of ID cards.

The user chooses which card or service to use via a user interface in the mobile phone and the selection is transmitted to the WAIO. All possible credit cards, bank cards, customer club cards, bonus cards, membership cards, coupons etc. are "stored" in the mobile phone A11, A12, E11, and selected when needed. A multiple selection of for example a credit card and a member's card can also be performed.

The mobile terminal communicates with the WAIO to set it in the right card mode/modes. The WAIO-card and the mobile phone communicate preferably with some sort of short-range wireless technology. The WAIO-card is then used as cards today, i.e. for payments (credit card, bank card, cash card), to register membership points, as an ATM card etc.

Different applications can have different security levels. The basic level is the authentication performed when starting the mobile phone (some persons use PIN-code, some do not).

The list of cards in the mobile phone can be "intelligent" and has the most used cards on top and it is also possible to have the most used cards pre-activated in the WAIO to speed up the payment/card registration process. If the user does not have a customer card/member's card in the present shop, the solution makes it possible for the retailer to program the POS-terminal to write an offer to the WAIO-card about getting/buying a customer card/member's card. The offer is then transferred to the mobile phone and displayed for the user.

One example of use could be like this. The user chooses which cards to use and the selection are transferred to the WAIO-card. The user uses the WAIO-card as a "common" smart card in the POS-terminal, but in this example it works as two cards at the same time, i.e. both for payment and registration of customer club bonus points. The POS-terminal writes the receipt to the WAIO-card which in turn transfers the receipt to the mobile phone where it can be stored for a limited time or directly transferred to an online server where it can be stored for a longer time (still limited though).

The solution makes it possible to pre-load the WAIO with configurable amounts of e-money and use it with or without a PIN-code in the shop's terminal or in a vending machine, i.e. without the need for the mobile phone. The mobile phone and in the next step the WAIO-card can be loaded via internet and it is also possible to load the WAIO-card directly in an ATM. The later implies need for changes of the ATMs. If using the WAIO-card in an ATM, the solution makes it possible to either get cash or to load the card itself with e-money (as mentioned above).

It will be possible for the user to decide if all, none or parts of the loaded e-money shall be in the WAIO-card (or in the phone). The phone keeps track of the e-money status in the card and in the phone and it is always easy for the user to check the status.

The concept also makes it possible to load e-money to another person's mobile phone or WAIO-card. (A PIN-code must be used.) This can for example be used to give your children e-money, to pay a debt to a friend or to tip a good waiter. The solution makes it possible to add a message to the e-money loading.

An example of e-money use could be like this. The user sends an inquiry to the bank (via the mobile network and internet) about getting access to the user's bank account and to load an amount of e-money to the mobile phone. Necessary security routines (e.g. authentication etc.) are of course performed. The bank sends the money back the same way and the user decides if all, parts or none of the money shall be transferred to the WAIO-card. The next time the WAIO-card and the mobile phone are put close together after e-money payments with the card the mobile updates the e-money status. This means that the mobile phone keeps track of the e-money in the card and in the phone, i.e. it shall always be possible for the user to easily check the amount of e-money in the phone and in the card and there is no risk that the "same dollar" is registered on both the phone and the card at the same time.

The solution makes it possible to load the mobile and when needed the WAIO-card with discounts the user have as a result of being a member in some association, a customer to some company or working at some company. An example could be that you get a discount in your local sports shop if you are a member in the local sports club. The user will be able to choose the store he/she is in and then get a list of all the discounts and coupons he/she have in that shop, i.e. it will be practically impossible to forget discounts and coupons. When the user uses the WAIO-card at the cash desk, the payment sum gets reduced according to the discounts.

The concept also makes it possible to get discounts to the mobile phone (for transfer to the card) in the same way as you get discounts in the post-box today. It is possible for the user to only get discounts connected to his/her WAIO-card applications. (It will of course be possible to decline this kind of discount-offers.) The solution makes it possible to transfer non-personal discounts to another person's mobile phone or WAIO-card.

An example of discount usage could be like this. The user accesses the Sports Club's homepage either via a computer or via the mobile phone. At the Sports Club's home page it is possible to check the discounts that the user gets as a Sports Club-member and to load these to the mobile phone. The mobile phone can sort the discounts in different ways, e.g. according to which shop the user is in, to different branches etc. When needed it is possible for the user to load the WAIO-card with the discounts sought for. At the pay desk the POS terminal reads the WAIO-card and reduces the payment sum with the loaded discounts and writes the receipt to the card for transfer to the mobile phone. The receipt can then either be saved in the phone for a limited time or directly stored in the Operator's server online (also for a limited, but longer, time).

When the payment is ready the concept makes it possible to store the receipt in the WAIO-card for transmission to the mobile phone where it can be saved or deleted, i.e. the user will be spared from "half-meter long" receipts in his/her wallet/pocket. (This implies though the need for changes of the POS system.) The receipt will be possible to save in the mobile phone during a limited time (for example during the warranty time). After this limited time it is possible to store the receipt online (also for a limited, but a longer time).

The WAIO will be equipped with a magnetic strip where one type of credit- or bank-card can be stored. This is to enable for the user to pay with the card even if the retailer's POS-system cannot handle smart cards. At the same time as the magnetic strip makes it possible to pay with the card practically everywhere, the limited function of the magnetic strip will probably become an incitement for retailers to invest in POS-systems which enable the use of smart cards.

The solution also makes it possible to pre-load the WAIO with tickets to spare time when entering a train, bus or airplane. This is of course only valid if the transport system uses a payment system where either a wireless smart card or a smart card can be used. The solution makes it possible to transfer tickets to another person's mobile phone or WAIO-card.

An example of downloading and using e-tickets could be like this. The user enters the transportation company's homepage to buy and download tickets. After choosing what type of ticket to buy, the user chooses what payment solution to use (from a list with the user's possible payment solutions) and enters the PIN-code connected to that payment solution. The tickets are then downloaded to the mobile phone and all, none or a few can then be transferred to the WAIO-card. The card is then used to enter the means of transport and the card reader/writer at the entrance reduces the ticket number in the WAIO-card. The next time the WAIO-card and the mobile phone is put close together the mobile phone updates the ticket-status to enable for the user to easily check how many tickets that are left in the mobile phone and on the WAIO-card (or how many days that are left for a time-limited ticket).

The concept makes it possible to perform online services with the WAIO handset, e.g. service registration, e-money charging, transactions, ticket issuance, receipt storage etc. Each user shall have a possibility to have a personal WAIO-card homepage on the Internet. The homepage shall require a PIN-code to log in and after logging in the user shall be able to reach all the application's homepages without new log in. The WAIO homepages could be hosted by some service provider or by a trust provider.

On the homepage the user will be able to find all kind of relevant information connected to the WAIO, including balances, bonus points, receipts, lists of valid guarantees of products bought with the WAIO-card and information about the guarantees' periods of validity. The solution also makes it possible for the user to add reminders about when a product's guarantee is close to the end, when a product's sale or return date is close to the end or about a discount that has a limited validity time. The homepage will of course be possible to reach from both a PC and the mobile phone.

The WAIO can have a colour display where the chosen card/cards logotypes are visible and it will be possible for the user to get a customized WAIO with picture, colour etc. The next step could be to integrate the user's ID-card or driver's license in the WAIO as well. It will also be possible for the user to have a company's logotype on the card and thus get the card cheaper or for free.

The solution makes it possible for the user to decide if the latest chosen application/(s) (credit cards etc.) shall remain in the card between the usage occasions. It will also be possible to set a timing-function for this service, e.g. that a credit card shall only be active for a certain amount of time. For security reasons the card issuer will be able to decide the maximum length of the active period. Some applications will though be possible to have activated continuously, e.g. transportation-tickets, e-money etc.

The concept makes it possible to have short-cuts to very easily load the application/(s) used most often. If the wrong application is loaded in the WAIO-card and the POS-terminal cannot read the card, the POS-terminal will initiate that the WAIO sends a question to the mobile phone that another card-application is needed. The POS-terminal sends a list of possible card applications to the WAIO (e.g. credit cards, bonus card etc.). The WAIO then transmits the list to the phone which in turn shows the list in the user interface. Only the applications that the user has access to shall be shown in the mobile phone list. The list shall be "intelligent", i.e. the shop's member's card, if any, shall be on top and followed by the user's most used credit/bank cards or e-money. These functions require though changes in the POS-terminals. It will be possible to change mobile phone and easily bring all the card-applications to the new phone. It will be very simple to reach the right application in the mobile phone and it will be very easy to load a new application and to delete a no longer desired one.

The concept also makes it possible to deactivate the whole card for security reasons. When the card is activated again, all the applications activated before the deactivation will be activated again automatically. The solution makes it possible to have different security levels for different applications, e.g. that a credit card application shall have a higher security level than a discount coupon application. The basic level of security is the authentication required when starting up the mobile phone (some persons use PIN-code, some do not).

A security solution for the communication between the phone and the card could look like this. A third party (a trust provider, could e.g. be an operator or a bank) handles the registration procedure. Both the WAIO and the mobile terminal have an identity, CID and TID, and are registered on the user at this trust provider. The WAIO card and the Mobile phone also share a key with the trust provider.

The user downloads an application to the mobile phone that makes it possible to communicate with the WAIO, and a security association SA is set up between the mobile phone and the WAIO with the help of the trust provider acting as a trusted third party. This security association consists of selected wireless protocol, an associated crypto suite, a shared secret key and other parameters related to a cryptographic context (IV etc.). The SA makes it possible for the mobile phone and the WAIO to securely communicate with each other regarding the downloaded applications.

To start with the service provider has to get the service approved by a trusted party that runs a secure server. The user has to download the application from the service provider (via cellular). After this the user has to register the service at some central secure server (communication over cellular). The secure server should also be managed by a trusted party. The service registration to a WAIO chip (in the phone and in the card) includes service area installation, shared secret delivery, charging of electronic money or receiving of a ticket onto the chip. The chip in the phone could either be a dedicated WAIO-chip or the SIM.

The user then downloads selected applications and application wide keys to the mobile phone and then utilizes the above described SA to securely transmit keys and applications to the WAIO-card. As both the mobile phone's and the WAIO-card's identities are registered on the user, it will not be possible to transmit information/money to another person's WAIO-card without approval from the user. When using the card for payments etc, the security level is the same as for a common smart card (or magnetic stripe if this has to be used).

The local security protocol could work like this. A single application defines two shared secrets, a service key to authorize service evocations and an area key to access the area inside a WAIO chip. These two keys are system keys and shared between the secure server, all WAIO-chips registered to the service and all readers/writers used by the server. This part of the protocol can be run offline, and the Reader/Writer can access the chip's internal memory to for instance increment or decrement a value.

The concept also makes it possible to deactivate the whole card for security reasons. When the card is activated again, all the applications activated before the deactivation will be activated again automatically. The solution makes it possible to have different security levels for different applications, e.g.

that a credit card application shall have a higher security level than a discount coupon application.

Figure 2:
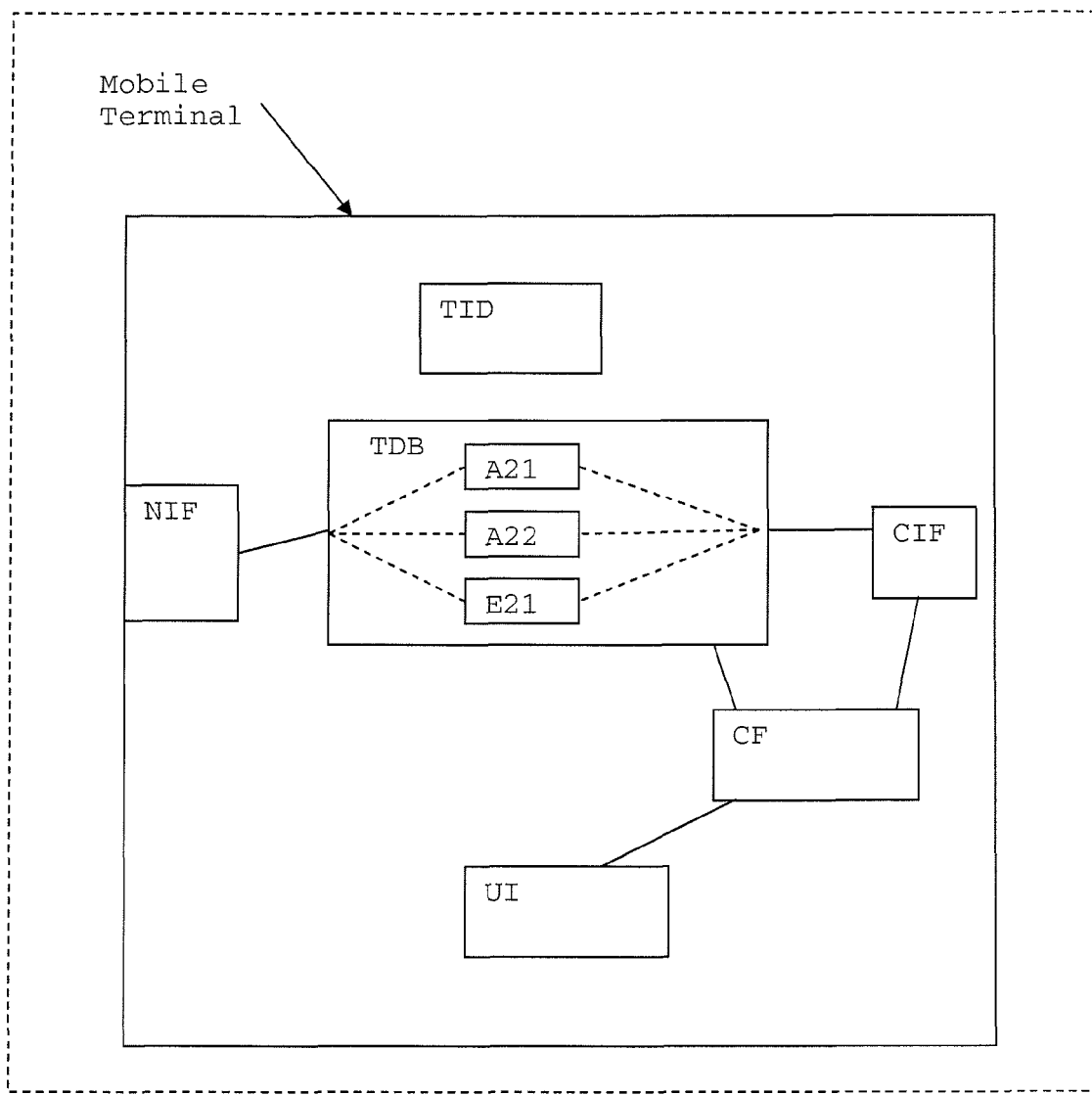
FIG. 2 is block diagram illustrating a mobile terminal comprising an interface towards card comprising an interface towards a mobile terminal and a point of service.

FIG. 2 illustrates a mobile terminal comprising a network interface NIF towards a telecommunication network. This could be the GSM cellular system or any telecommunication network. The mobile terminal has a user interface UI. The mobile terminal also comprises a mobile terminal database TDB configured for storing data A21, A22, E21. This data can be received from the telecommunication network. The card interface CIF is suitable for connecting the mobile terminal MT with the WAIO. The mobile terminal also comprises a card function CF suitable for controlling and transfer data between the mobile terminal MT and the card database CDB via the card interface CI). The mobile terminal also has a mobile terminal ID TID.

As the WAIO-card concept also enables "true" wireless payments, i.e. with the mobile phone only, it offers a smooth and easy migration to a completely "card-free" payment environment. The WAIO-card concept could be the solution that bridges over the chasm between the early adopters and the early majority pragmatists. The retailer's POS system does not have to be changed, i.e. the retailer does not have to make any investments. The users can use the card at all retailers (except at the few that only handles cash). The users only need one single card in the wallet and no cash. The users only need one single PIN-code.

The invention is not limited to the above described and in the drawings shown embodiments but can be modified within the scope of the enclosed claims.

The invention claimed is:

1. A system comprising a mobile terminal and a card adapted for contact- and contactless-services, wherein the mobile terminal is configured to communicate with the card and comprises:
   a wireless network interface configured to communicate with a telecommunication network;
   a user interface;
   a terminal database configured to store data received from the telecommunication network;
   a card interface configured to connect the mobile terminal with the card, wherein the card interface is wireless; and
   wherein the card comprises:
      a contact point of service configured to perform a transaction through a contact interface of the card;
      a card database configured to be controlled by the mobile terminal, to store data, and to be accessed via the point of service interface; and
      a wireless mobile terminal interface configured to connect the card to the mobile terminal via the card interface to perform a contactless transaction through the mobile terminal via data transfer between the card and mobile terminal; and
      a card function configured to control and transfer data between the mobile terminal and the card database via the card interface.

2. The system of claim 1, wherein the card database and the contact point of service are integrated in an integrated circuit.

3. The system of claim 1, wherein the contact point of service is a smartcard interface.

4. The system of claim 1, wherein the card includes a display configured to display information related to a function of the card.

5. The system of claim 1, wherein the card database is configured to store at least one of:
   account data received from the mobile terminal;
   electronic money received from the mobile terminal;
   data concerning identification;
   data concerning tickets; and
   data received from the contact point of service.

6. The card of claim 5, wherein data received from the contact point of service is a receipt of a payment.

7. The system of claim 1, wherein the card includes a magnetic strip for storing data related to a bank-card or a credit-card.

8. The system of claim 1, wherein the card function is controlled via the user interface.

9. The system of claim 1, wherein the card function is configured for transfer data between the terminal database and the card database via the card interface.

10. The system of claim 1, wherein the transferred data is at least one of account data, electronic money, data concerning identification, data concerning tickets, and data received from the point of service interface.

11. The system of claim 1, wherein the mobile terminal includes a mobile terminal identity adapted to identify the mobile terminal against the card by using a key shared with a card identity of the card.

* * * * *

UNITED STATES PATENT AND TRADEMARK OFFICE
CERTIFICATE OF CORRECTION

| | | |
|---|---|---|
| PATENT NO. | : 8,348,155 B2 | Page 1 of 1 |
| APPLICATION NO. | : 12/678681 | |
| DATED | : January 8, 2013 | |
| INVENTOR(S) | : Wollbrand et al. | |

It is certified that error appears in the above-identified patent and that said Letters Patent is hereby corrected as shown below:

In the Drawings

In Fig. 1, Sheet 1 of 2, delete "FIG" and insert -- FIG. --, therefor.

In Fig. 2, Sheet 2 of 2, delete "FIG" and insert -- FIG. --, therefor.

In the Specification

In Column 2, Line 48, delete "WAIO card" and insert -- WAIO-card --, therefor.

In Column 6, Line 21, delete "WAIO card" and insert -- WAIO-card --, therefor.

In Column 7, Line 14, delete "CI)." and insert -- CIF. --, therefor.

In the Claims

In Column 8, Line 26, in Claim 6, delete "card" and insert -- system --, therefor.

Signed and Sealed this
Thirteenth Day of May, 2014

Michelle K. Lee
*Deputy Director of the United States Patent and Trademark Office*